June 16, 1936.  R. C. BRADLEY  2,044,050
BALANCED DIAPHRAGM SYSTEM AND METER UTILIZING THE SAME
Filed Jan. 3, 1934  2 Sheets-Sheet 1
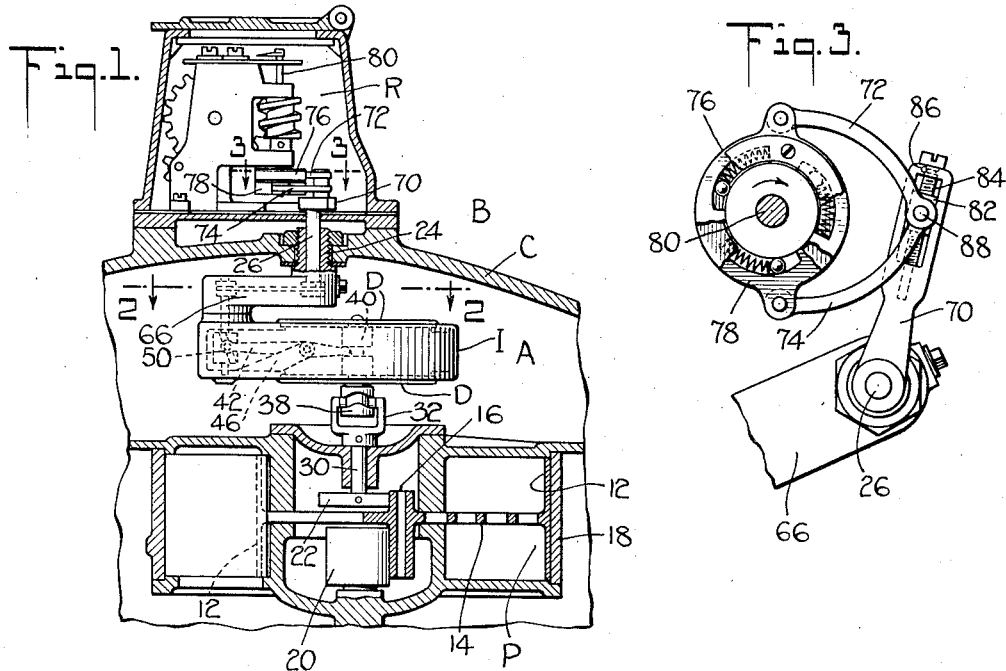
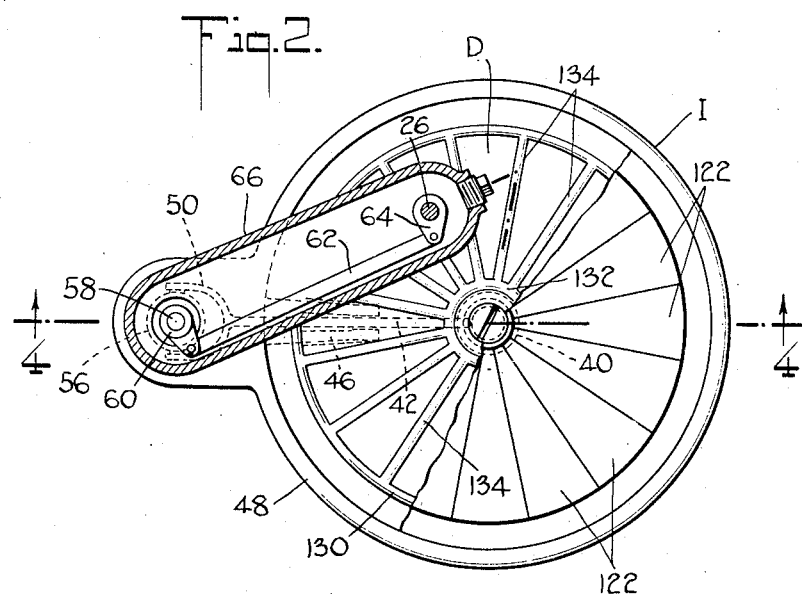
INVENTOR
Richard C. Bradley
BY
ATTORNEYS

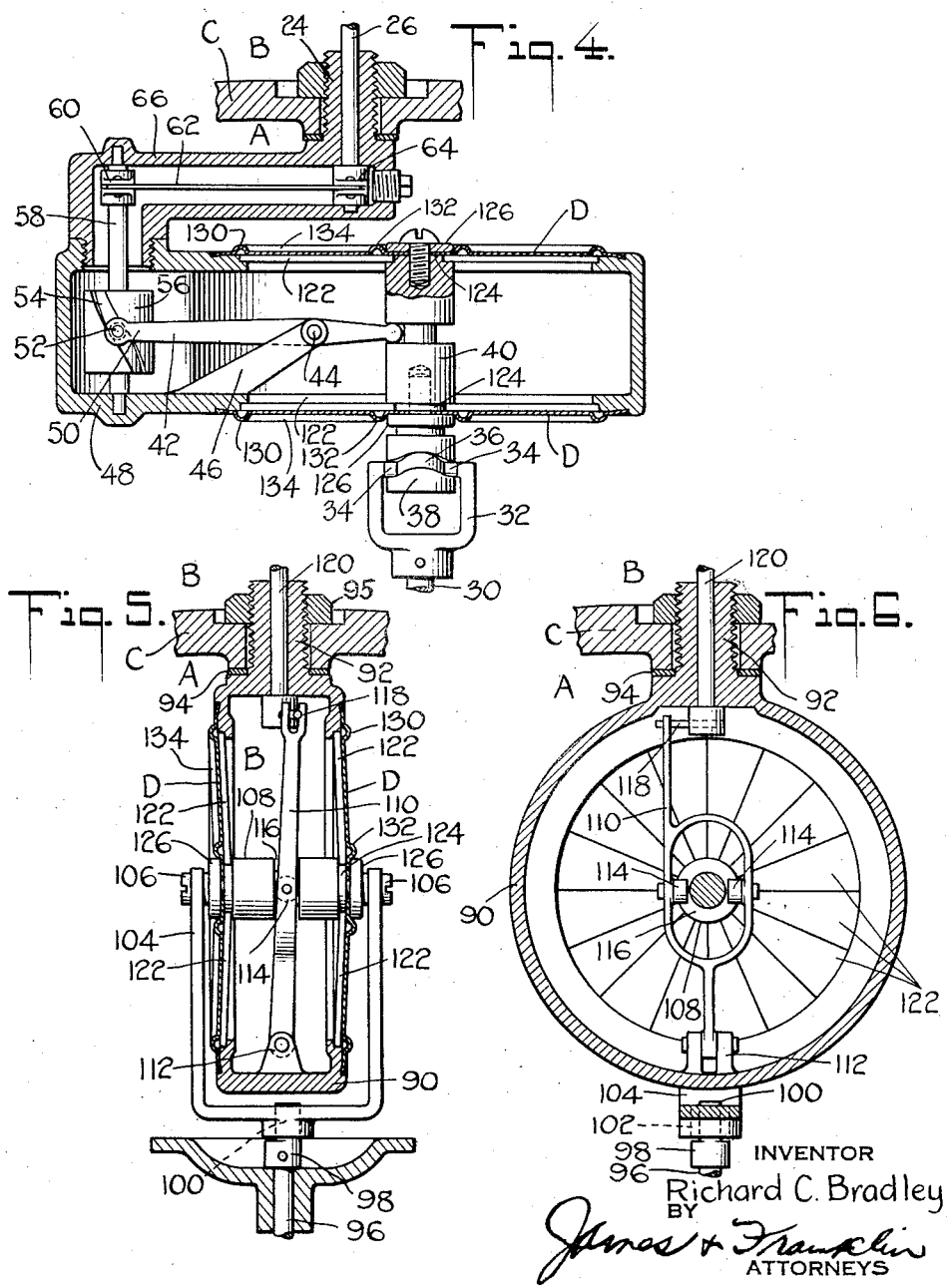

Patented June 16, 1936

2,044,050

UNITED STATES PATENT OFFICE 2,044,050

BALANCED DIAPHRAGM SYSTEM AND METER UTILIZING THE SAME

Richard C. Bradley, New York, N. Y., assignor of one-half to Fred J. Bradley, St. Albans, N. Y.

Application January 3, 1934, Serial No. 705,165

18 Claims. (Cl. 73—253)

This invention relates to a balanced diaphragm system for transmitting mechanical movement between zones of different pressure without leakage therebetween, and relates more particularly to liquid meters utilizing such a system for interconnecting the driving element within the meter and the counter or register outside of the meter.

One primary object of my invention is to sensitively mechanically interconnect two zones of different pressure or/and fluid separated by a partition or vessel. To use a simple diaphragm introduces large resistance to movement, especially when dealing with a large pressure difference. The use of a stuffing box or gland introduces resistance and also forms a point of leakage, for even if the stuffing box prevents leakage at first, it needs constant inspection and attention lest leakage soon begin. One primary object of my invention is to solve this problem, which I do by means of a pair of diaphragms connected for opposite movement relative to one of the zones, thereby forming a balanced diaphragm system having no resistance to movement by reason of pressure difference.

The invention is here illustrated in its particular application to a meter for measuring the flow of liquids. Such meters ordinarily include an enclosed flow chamber having a piston or other movable metering element responsive to flow of liquid therethrough, and a register or counter mounted outside of the meter chamber for indicating and totalizing the flow. Conventional meters further employ an intermediate, ordinarily taking the form of a partially or fully enclosed frame or housing secured to the flow chamber near the counter by a neck through which a driving spindle leads to the counter, this driving spindle being sealed by a stuffing box or gland. I have found that most of the load or resistance of the meter is due to the friction created by this stuffing box, and this in turn reduces the sensitivity and the accuracy of the meter, particularly at low rates of flow. The difficulty is especially aggravated when handling fluids at high pressure, as, for example, oil pipe lines under a pressure of, say, 200 pounds per square inch, because the stuffing box must be tightened commensurately.

It is accordingly a further and more particular object of my invention to eliminate the stuffing box in such meters, and to thereby greatly reduce the meter friction or load and to increase the meter accuracy. Still another feature of my invention is the accomplishment of the foregoing object without necessitating change or departure from standard types of piston or driving element and standard types of counter or register. Considered in this aspect, an object of my invention resides in the provision of a wholly new type of intermediate adapted to replace the intermediate of conventional meters, and eliminating the use of a stuffing box.

Still further objects of my invention center about the diaphragm construction, and are: to make possible the use of thin flexible metallic diaphragms without danger of crystalization or breakage; to provide diaphragms of the utmost sensitivity and flexibility; and to provide reinforcing means to stiffen said diaphragms against high pressures.

To the accomplishment of the foregoing and such other objects as will hereinafter appear, my invention consists in the balanced diaphragm system and the meter elements, and their relation one to another, as hereinafter are more particularly described in the specification and sought to be defined in the claims. The specification is accompanied by drawings, in which:

Fig. 1 is a section through a meter embodying one form of my invention;

Fig. 2 is an enlarged section taken in the plane of the line 2—2 of Fig. 1;

Fig. 3 is a partially sectioned plan view taken in the plane of the line 3—3 of Fig. 1;

Fig. 4 is a section taken in elevation in the plane of the line 4—4 of Fig. 2;

Fig. 5 is a section taken in elevation through a modified form of intermediate embodying features of my invention; and Fig. 6 is a section through the same intermediate, this section being taken in a plane at right angles to the section of Fig. 5.

Referring to the drawings and more particularly to Fig. 1 thereof, two zones of different pressure, A and B, are separated or partitioned by a wall C. Mechanical movement is transferred between the zones A and B through the wall C in a sensitive manner without leakage and without a stuffing box, by utilizing a balanced diaphragm system D. The diaphragms D move simultaneously and equally, but, by virtue of their arrangement, the diaphragms in effect move oppositely with respect to the pressure zone A, and there is accordingly no resistance to movement of the diaphragms by reason of the pressure in zone A.

The invention is shown in its application to a liquid meter, pressure zone A being the flow chamber within the meter casing C, and zone B being atmospheric or barometric pressure. As will be readily appreciated by those skilled in the art, casing C is an enclosed casing carrying within itself an appropriate meter element responsive to the flow of liquid through the casing. In the present instance this meter element takes the form of a piston P the motion of which is ultimately transferred to and integrated in a register R. Piston P includes an annular skirt 12, a web 14, and a central piston pin 16. The piston oscillates within an annular casing 18, its motion being guided by contact of piston pin 16 with a central guide 20. The revolution of piston pin 16 about guide 20 is transmitted to a key 22, thence to an intermediate I secured to the meter casing C by a neck 24. A spindle 26 passes through neck 24 and is connected to register R.

The conventional intermediate consists of a train of reduction gearing. The intermediate may be open or enclosed, but even if enclosed it is flooded with the liquid passing through the meter. To prevent leakage out of the meter casing, the spindle 26 is conventionally supplied with a stuffing box or gland which, I find from careful experimentation, constitutes most of the load on the meter. In the present case, the stuffing box or gland is eliminated and there is no attempt to seal the passage of spindle 26 through neck 24. On the contrary, the atmospheric pressure zone B may be considered as existing within the intermediate casing I which, of course, is itself leakproof and constitutes an effective seal between the zones A and B.

Referring now to Fig. 4 as well as to Fig. 1, the key 22, which is driven by piston P, is secured to a shaft 30 carrying at its upper end a yoke 32 having rollers 34 riding in a cam groove 36 on a cam 38. Cam 38 is secured directly to a spool 40 which interconnects the lower and upper diaphragms and which insures simultaneous and equal movement thereof. It will be evident that rotation of shaft 30 causes reciprocation or vibration of the spool 40 and the diaphragms D.

Vibration of spool 40 is multiplied by lever 42 pivoted at 44 in supports 46 formed integrally with the casing 48. The bifurcated end 50 of lever 42 carries fingers 52 slidable in helical grooves 54 on a cylindrical cam 56, thus causing oscillation of the cam. Cam 56 is secured to a spindle 58 carrying at its upper end a small crank 60 connected by means of a connecting rod 62 to a crank 64 secured to the spindle 26 borne in the neck 24.

Referring now to Fig. 3 and also to Fig. 1, it will be noted that spindle 26 carries at its upper end a crank 70 connected, through connecting rods 72 and 74, to the driving rings 76 and 78 of a pair of opposed ratchets or friction clutches the inner or driven portions of which are secured to the worm shaft 80 of the register R. It will be understood that upon oscillation of crank 70 in one direction, one of the clutches is effective to advance the worm shaft 80, and the other clutch is ineffective, it then undergoing a restoring movement. Upon oscillation of connecting rod 70 in the opposite direction, the restored clutch becomes effective while the advanced clutch is restored. In either case, the worm shaft 80 is advanced. The oscillatory motion of spindle 26 is thereby transformed into intermittent but progressive rotary motion of the register or worm shaft 80. It will be understood that positive ratchets may, if desired, be employed instead of the friction ratchets shown.

In passing, it may be observed that the radius arm of crank 70 is preferably made adjustable. Referring to Fig. 3, the arm 70 carries a block 82 which is adjustable longitudinally thereof by means of an adjusting screw 84 anchored against axial movement by a pin 86. The crank pin 88 to which the connecting rods 72 and 74 are joined is, of course, carried by block 82. It will thus be seen that the meter is conveniently and minutely calibratable by adjustment of screw 84 which is accessible from outside of the meter casing when the register housing is removed.

It will thus be seen that the balanced diaphragm system D, which is conveniently adapted to the transmission of only vibratory or reciprocatory movement, is employed in the meter together with appropriate mechanical means for first transforming the rotary movement of the piston P to a reciprocatory movement of the diaphragm, and additional mechanism for thereafter translating the reciprocatory movement of the diaphragm to rotary movement of the register shaft. It will be appreciated that these intermediate mechanisms are required primarily because the new intermediate I is used in place of a conventional intermediate in a meter having conventional driving and registering elements.

As a matter of fact, the intermediate heretofore described is especially complex because it is designed to fit directly in place of a conventional intermediate in a particular meter in which the vertical dimension available between the piston P and the neck 24 was limited and in which the location of the neck 24 was predetermined. It is for that reason that the intermediate casing is made of two parts, the part 48 which supports the diaphragms and lever 42, and the part 66 which houses connecting rod 62, and which is disposed at an angle, as is best shown in Fig. 2, in order to bring the neck 24 and spindle 26 in proper location with respect to the counter R, for a predetermined location of shaft 30 and piston P.

When the meter body is re-designed slightly to receive the balanced diaphragm system of the present invention, the mechanism may be simplified, and an example of this is shown in Figs. 5 and 6 of the drawings. Referring to these figures, the intermediate casing is arranged in a vertical rather than in a horizontal plane, and consists essentially of an annular shell 90 dimensioned to support the diaphragms D and carrying at its upper edge a neck 92 corresponding to the neck 24 already mentioned and similarly adapted to be clamped in sealed relation to the meter casing by means of a sealing gasket 94 and a nut 95 screwed upon the threaded neck 92 outside of the casing wall. The piston or other driving element of the meter rotates a shaft 96 carrying at its upper end a crank 98 of slight eccentricity. The crank pin 100 of crank 98 rides in a transverse slot 102 (see Fig. 6) formed at the bottom of a yoke 104 the arms of which are connected by screws 106 to a spool 108 which joins the diaphragms D. A generally upright lever 110 is anchored at its lower end in uprights 112 and carries at its middle a pair of rollers 114 which ride in the groove 116 of spool 108. The upper end of lever 110 is bifurcated to receive a pin 118 projecting from the lower end of a spindle 120 passing through the neck 92. It will be manifest that rotation of shaft 96 causes vibration of diaphragms D, which in turn causes oscillation of spindle 120. The entire unit replaces that heretofore described and is similarly surmounted by a crank and opposed ratchet system such as was described in connection with Fig. 3; the neck 92 corresponding to the neck 24, and oscillatable spindle 120 corresponding to oscillatable spindle 26. It will also be appreciated that the pressure zones A and B are divided at neck 92, as is schematically indicated by the wall C corresponding to the casing C in Fig. 1. It will further be understood that the zone B exists within the intermediate, that is, between the diaphragms D, there being no attempt to seal the spindle 120.

Some additional features of my invention concern the constructional details of the diaphragms.

It is important that these diaphragms be exceedingly flexible yet stiff enough to resist high pressure. It is also important to avoid any danger of crystallization and breakage under long repeated vibration. I stiffen or reinforce the otherwise extremely flexible diaphragms by stiffening plates next described. The stiffening plate consists essentially of a circular plate of relatively thick metal located adjacent the diaphragm and severed radially to form a relatively large number of discrete segments which reinforce the diaphragm in a radial direction while freely permitting vibration of the diaphragm. These segments are best shown in Fig. 6, being numbered 122. The manner in which the segments are anchored adjacent diaphragms D is best shown in Figs. 4 and 5, in which it will be seen that the segments are carried at their outer edges in channels formed in the casing of the intermediate, and are carried at their inner edges in annular grooves formed on spool 40. When the spool is vibrated, the segments 122, despite their thickness and rigidity, readily follow the vibrations of the spool. Collapse of the diaphragms D inwardly under the pressure surrounding the same is, of course, effectually prevented by this reinforcement.

The diaphragms D may be made of leather or other appropriate material, but in the present case I illustrate the use of an exceedingly thin flexible metal. The discs or diaphragms of metal are soldered at their outer peripheries to the intermediate casing. The diaphragms are secured to the spool at the center thereof by locking the same between the ends 124 of the spool and washers or clamping members 126 outside of the diaphragm. If desired, this connection may also be soldered.

To prevent fatigue and crystallization of the metal, I prefer to channel the same in the following manner. The disc of metal is provided with a peripheral channel 130 near its outer periphery and preferably located at the point of support of reinforce plates 122. The disc is further annularly channeled at 132 just outside the point of anchorage thereof. The inner and outer peripheral channels are preferably interconnected by a series of radial channels 134 best shown in Fig. 2, and these radial channels are preferably disposed in superposed relation to the severances between the segments 122 of the reinforce plate. It will be understood that upon vibration of the diaphragms, there is a rolling of metal around the channels 130, 132 and 134, rather than a distinct bending, and this rolling distributes the strain and practically eliminates fatigue and crystallization. The annular channels accommodate the necessary bending during passage of the diaphragm from its inner to its outer position, as well as the necessary radial compression at the intermediate position. The radial channels accommodate the peripheral expansion of the metal as the diaphragm moves to its terminal positions, and the peripheral compression of the metal as the diaphragm passes through its intermediate position.

It is believed that the construction and operation as well as the many advantages of my improved balanced diaphragm system and of the liquid meter embodying the same, will be apparent from the foregoing detailed description thereof. The balanced diaphragm system permits of sensitive mechanical connection between mechanisms disposed on opposite sides of a partition which seals two different zones of pressure or fluid. There is no resistance to movement of the diaphragms by reason of a difference in pressure, regardless of how great. The use of a stuffing box, with attendant friction and frequent leakage, is dispensed with. The invention may be applied to a meter without altering the driving portion and register portion of the meter in any respect. The meter may be made more sensitive and consequently more accurate, particularly for low rates of flow. The diaphragm may be exceedingly thin and flexible and yet is stiff and resistant to high pressure. It is not subject to fatigue or crystallization.

It will be apparent that while I have shown and described my invention in preferred forms, many changes and modifications may be made in the structure disclosed without departing from the spirit of the invention, defined in the following claims.

I claim:

1. In combination, a main wall separating different pressure zones, mechanism on one side of said wall, mechanism on the other side of said wall, and means to transmit motion between said mechanisms, said means including a unitary enclosed leakproof subchamber having two flat parallel sides joined by a peripheral wall, said peripheral wall having a neck connected to the aforesaid main wall, said neck connection acting as the sole support for said subchamber, said sides being provided with balanced diaphragms connected for equal movement, the chamber being exposed on the outside to the pressure in one zone, and being exposed on the inside through the neck to the pressure in the other zone, means connecting one of said mechanisms to said diaphragms on the outside of said chamber, and means connecting the other of said mechanisms to the diaphragms through the neck and on the inside of said chamber.

2. In combination, a main vessel, mechanism inside said vessel, mechanism outside said vessel, and means to transmit motion between said mechanisms, said means including a unitary subchamber having two flat parallel walls joined by a peripheral wall, said peripheral wall having a neck connected to said main chamber, said neck connection acting as the sole support for said subchamber, said flat walls being provided with balanced vibratile diaphragms connected for equal movement in opposite direction relative to the main vessel, the subchamber having an inside and an outside and being exposed on one of said sides to the pressure in the main vessel and being exposed on the other of said sides to the pressure outside of the main vessel, and means connecting said mechanisms to said diaphragms.

3. In combination, a main vessel, mechanism inside said vessel, mechanism outside said vessel, and means to transmit motion between said mechanisms, said means including an enclosed subchamber having two flat parallel walls joined by a peripheral wall, said peripheral wall having a neck connected to the wall of said main chamber, said neck connection acting as the sole support for said subchamber, said walls being provided with balanced leakproof flexible diaphragms connected for equal movement, the subchamber having an inside and an outside and being exposed on one of said sides to the pressure in the main vessel and being exposed on the other of said sides to the pressure outside of the main vessel, means connecting one of said mechanisms to said diaphragms on the outside of said subchamber, and means connecting the other of said mechanisms to the diaphragms through the neck and on the inside of said subchamber.

4. In combination, an enclosed main vessel, mechanism inside said vessel, mechanism outside said vessel, and means to transmit motion between said mechanisms, said means including an enclosed subchamber having two flat parallel walls and a neck connected to the wall of said main chamber, said walls being provided with balanced flexible diaphragms connected for equal movement, the subchamber having an inside and an outside and being exposed on one of said sides to the pressure in the main vessel and being exposed on the other of said sides to the pressure outside of the main vessel, means connecting one of said mechanisms to said diaphragms on the outside of said subchamber, and means connecting the other of said mechanisms to the diaphragms through the neck and on the inside of said subchamber, each of said means being adapted to interchange unidirectional rotary motion and reciprocatory motion, whereby unidirectional rotary movement of one mechanism may be transferred to the other mechanism through vibratory movement of the diaphragms.

5. An integrating flow meter comprising an enclosed leak-proof flow chamber, a counter outside the chamber, a pair of vibratile diaphragms subjected to equal pressure and thereby balanced, said balanced diaphragms forming an effective part of the leak-proof wall of the chamber, means connecting the same for opposite movement relative to the chamber, a flow responsive element inside said chamber and arranged to vibrate the diaphragms, and unidirectionally operative clutch mechanism between the diaphragms and the counter to integrate the vibrations of the diaphragms.

6. An integrating flow meter comprising an enclosed flow chamber, including a movable piston element for measuring the quantity of liquid flowing through the meter, a totalizing register or counter mounted outside of said chamber, and means interconnecting the element and counter including a pair of vibratile diaphragms subjected to equal pressure and thereby balanced, means connecting said diaphragms for opposite movement relative to the chamber, means connecting the element to the diaphragms, and means connecting the diaphragms to the counter.

7. An integrating flow meter comprising an enclosed flow chamber including a rotary element responsive to flow of liquid, a register or counter mounted outside of said chamber, and means interconnecting the element and counter including a pair of diaphragms subjected to equal pressure and thereby balanced, means connecting said diaphragms for opposite movement relative to the chamber, means connecting the rotary element to the diaphragms and adapted to translate rotary motion to vibratory motion of the diaphragm, and means connecting the diaphragms to the counter, said means being arranged to translate the vibratory motion of the diaphragms into rotary motion of the counter.

8. An integrating flow meter comprising an enclosed flow chamber including a rotary element responsive to flow of liquid therethrough, a register or counter mounted outside of said chamber, and means interconnecting the element and counter including a leakproof subchamber having flat parallel sides and connected to the wall of the flow chamber, each of said sides having a flexible diaphragm subjected to equal pressure and thereby balanced, means connecting said diaphragms for equal movement, means connecting the rotary element to the diaphragms and adapted to translate rotary motion to vibratory motion of the diaphragm, and means connecting the diaphragms to the counter, said means being arranged to translate the vibratory motion of the diaphragms into rotary motion of the counter.

9. An integrating flow meter comprising an enclosed flow chamber including a piston responsive to flow of liquid therethrough, a register or counter mounted outside of said chamber, and means interconnecting the piston and counter including a leakproof subchamber having flat parallel sides and mounted inside the flow chamber by a neck connected to the wall of the flow chamber, each of said sides having a flexible diaphragm subjected to equal pressure and thereby balanced, means connecting said diaphragms for equal movement, means connecting the piston to the diaphragms outside of the subchamber and adapted to translate rotary motion of the piston to vibratory motion of the diaphragm, and means connecting the diaphragms inside the subchamber through the neck to the counter, said means being arranged to translate the vibratory motion of the diaphragms into rotary motion of the counter.

10. An integrating flow meter comprising an enclosed flow chamber including a movable element responsive to flow of liquid therethrough, a register or counter mounted outside of said chamber, and means interconnecting the element and counter including a pair of vibratile diaphragms subjected to equal pressure and thereby balanced, means connecting said diaphragms for opposite movement relative to the chamber, means connecting the element to the diaphragms to vibrate the same, and means connecting the diaphragms to the counter, said means including a rotatable shaft connected to the counter, a pair of opposed clutches having the driven elements thereof secured to the shaft, and connecting rods moved by the diaphragms and connected to the driving elements of the clutches.

11. An integrating flow meter comprising an enclosed flow chamber including a piston responsive to flow of liquid therethrough, a register or counter mounted outside of said chamber, and means interconnecting the piston and counter including a leakproof subchamber having flat parallel sides and connected to the wall of the flow chamber, each of said sides having a flexible diaphragm subjected to equal pressure and thereby balanced, means connecting said diaphragms for equal movement, means connecting the piston to the diaphragms and adapted to translate rotary motion of the piston to vibratory motion of the diaphragm, and means connecting the diaphragms to the counter, said means including a rotatable shaft connected to the counter, a pair of opposed clutches having the driven elements thereof secured to the shaft, and connecting rods moved by the diaphragms and connected to the driving elements of the clutches.

12. A meter comprising an enclosed flow chamber including a piston responsive to flow of liquid therethrough, a register or counter mounted outside of said chamber, and means interconnecting the piston and counter including a leakproof subchamber having flat parallel sides and mounted inside the main chamber by a neck connected to the wall of the flow chamber adjacent the counter, each of said sides having a flexible diaphragm, means connecting said diaphragms for equal movement, means connecting the piston to the diaphragms outside of the subchamber and adapted to translate rotary motion of the piston to vibratory motion of the diaphragm, and means connecting the diaphragm inside the subchamber through the neck to the counter, said means including a spindle passing through the neck, means inside said subchamber to oscillate the spindle in response to vibration of the diaphragms, a crank on said oscillatable spindle, a rotatable shaft connected to the counter, a pair of opposed clutches having the driven elements thereof secured to the shaft, and connecting rods between the crank and the driving elements of each of the clutches.

13. An integrating flow meter comprising an enclosed flow chamber including a movable piston element for measuring the quantity of liquid flowing therethrough, a totalizing register or counter mounted outside of said chamber, and means interconnecting the element and counter including a pair of diaphragms subjected to equal pressure and thereby balanced, each diaphragm consisting of a thin disc of flexible metal, said disc being channeled by annular and radial channels, means connecting the diaphragms for simultaneous opposite movement, means connecting the meter element to the diaphragms, and means connecting the diaphragms to the counter.

14. An integrating flow meter comprising an enclosed flow chamber including a movable piston element for measuring the quantity of liquid flowing therethrough, a totalizing register or counter mounted outside of said chamber, and means interconnecting the element and counter including a leakproof subchamber having flat parallel sides and connected to the wall of the flow chamber, each of said sides having a diaphragm consisting of a thin disc of flexible metal, said disc being channeled by annular channels and by radial channels extending between said annular channels, each of said diaphragms being reinforced by a stiffening plate circular in outline and severed radially to form segmental radial stiffening plates, a spool-like member interconnecting the diaphragms for simultaneous equal movement and also receiving and supporting the inner ends of the stiffening segments, means connecting the movable meter element to the spool and diaphragms, and means connecting the spool and diaphragms to the counter.

15. An integrating flow meter comprising an enclosed flow chamber including a piston for measuring the quantity of liquid flowing therethrough, a totalizing register or counter mounted outside of said chamber, and means interconnecting the piston and counter including a leakproof subchamber having flat parallel sides and mounted inside said chamber by a neck connected to the wall of the flow chamber, each of said sides having a diaphragm consisting of a thin disc of flexible metal, said disc being channeled by annular channels at its inner and outer peripheries and by radial channels extending between said annular channels, each of said diaphragms being reinforced by a stiffening plate circular in outline and severed radially to form a large number of segmental radial stiffening plates, a spool-like member interconnecting the diaphragms for simultaneous equal movement and also receiving and supporting the inner ends of the stiffening segments, means connecting the piston to the spool and diaphragms outside of the subchamber and adapted to translate rotary motion of the piston to vibratory motion of the diaphragm, and means connecting the spool and diaphragms inside the subchamber through the neck to the counter, said means being arranged to translate the vibratory motion of the diaphragms into rotary motion of the counter.

16. A unitary chamber having flat parallel walls joined by a peripheral wall, said peripheral wall having a neck, each of said flat walls having a flexible diaphragm, said diaphragms being reinforced by a stiffening plate circular in outline and severed radially to form a large number of segmental radial stiffening plates, a spool-like member interconnecting the diaphragms for simultaneous equal movement and also receiving and supporting the inner ends of the stiffening segments, a spindle mounted in said neck and arranged to oscillate on its own axis, and means operatively connecting the spool and diaphragms to the spindle.

17. An intermediate for an integrating flow meter, said intermediate comprising a chamber having flat parallel walls and a neck, each of said walls having a flexible diaphragm subjected to equal pressure and thereby balanced, means interconnecting the diaphragms for simultaneous equal movement, a spindle mounted in said neck and oscillatable on its own axis, means connecting the diaphragms to the spindle to cause oscillatory movement of the spindle in response to vibratory movement of the diaphragms, and means connected to said spindle for changing the oscillatory movement thereof to rotary movement suitable for driving a counter.

18. An intermediate for an integrating flow meter, said intermediate comprising a chamber having flat parallel walls and a neck, each of said walls having a flexible diaphragm, each of said diaphragms consisting of a thin circular lamination of flexible metal, said lamination being channeled by annular and radial channels, each of said diaphragms being reinforced by a stiffening plate circular in outline and severed radially to form segmental radial stiffening plates, a spool-like member interconnecting the diaphragms for simultaneous equal movement and also receiving and supporting the inner ends of the stiffening segments, a spindle mounted in said neck and arranged to oscillate on its own axis, means connecting the spool and diaphragms to the spindle to cause oscillatory movement of the spindle in response to vibratory movement of the diaphragms, and means connected to said spindle for changing the oscillatory movement thereof to rotary movement suitable for driving a counter.

RICHARD C. BRADLEY.